United States Patent
Fujii et al.

(10) Patent No.: US 9,067,509 B2
(45) Date of Patent: Jun. 30, 2015

(54) SEAT OCCUPANCY DETERMINATION APPARATUS

(71) Applicant: AISIN SEIKI KABUSHIKI KAISHA, Kariya-shi (JP)

(72) Inventors: Hiroyuki Fujii, Kariya (JP); Ryota Nakanishi, Obu (JP); Akito Ito, Nukata-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 133 days.

(21) Appl. No.: 13/764,135

(22) Filed: Feb. 11, 2013

(65) Prior Publication Data
US 2013/0211666 A1 Aug. 15, 2013

(30) Foreign Application Priority Data
Feb. 15, 2012 (JP) .................. 2012-030853

(51) Int. Cl.
| | |
|---|---|
| B60R 22/00 | (2006.01) |
| E05F 15/00 | (2006.01) |
| G05D 1/00 | (2006.01) |
| B60N 2/00 | (2006.01) |
| B60R 22/48 | (2006.01) |

(52) U.S. Cl.
CPC ............. B60N 2/002 (2013.01); B60R 22/48 (2013.01); *B60R 2022/4816* (2013.01); *B60R 2022/4858* (2013.01)

(58) Field of Classification Search
USPC .................... 701/31.4, 34.4, 29.1, 45; 180/41; 280/735; 177/136
See application file for complete search history.

(56) References Cited

U.S. PATENT DOCUMENTS

| | | | | |
|---|---|---|---|---|
| 6,957,591 | B2 * | 10/2005 | Takafuji et al. | 73/862.391 |
| 7,791,462 | B2 * | 9/2010 | Sakai | 340/457.1 |
| 2012/0312604 | A1 | 12/2012 | Fujii | |

FOREIGN PATENT DOCUMENTS

JP 9-207638 8/1997

OTHER PUBLICATIONS

U.S. Appl. No. 13/764,015, filed Feb. 11, 2013, Fujii.
U.S. Appl. No. 13/764,082, filed Feb. 11, 2013, Fujii, et al.
U.S. Appl. No. 13/764,185, filed Feb. 11, 2013, Fujii, et al.

* cited by examiner

*Primary Examiner* — Adam Tissot
(74) *Attorney, Agent, or Firm* — Oblon, McClelland, Maier & Neustadt, L.L.P.

(57) ABSTRACT

A seat occupancy determination apparatus includes first and second load sensors arranged at one end of a lower side of a seat in a width direction, and a load decrease determination process portion determining a load decrease caused by a turning of a vehicle in a case where an inclination of a decrease of a load detected by the load sensors is gentle in a state where a seat belt detection portion detects a disengagement state of a seat belt while an occupant seated state is determined by a determination portion, the load decrease determination process portion determining the load decrease caused by an occupant moving away from the seat and that the occupant is not seated on the seat in a case where the inclination of the decrease of the load detected by the load sensors is steep.

6 Claims, 8 Drawing Sheets

SEAT OCCUPANCY DETERMINATION APPARATUS

CROSS REFERENCE TO RELATED APPLICATIONS

This application is based on and claims priority under 35 U.S.C. §119 to Japanese Patent Application 2012-030853, filed on Feb. 15, 2012, the entire content of which is incorporated herein by reference.

TECHNICAL FIELD

This disclosure generally relates to a seat occupancy determination apparatus.

BACKGROUND DISCUSSION

In recent years, in order to improve performance of various safety devices, for example, of a seat belt and an airbag provided at a vehicle, operations of such safety devices may be controlled in accordance with a weight of an occupant seated on a seat of the vehicle. For example, in a case where the occupant seated on the seat does not tighten and fasten the seat belt, a warning lamp is generally turned on for indicating that the seat belt is not fastened after the detection that the occupant is seated on the seat. In addition, according to regulations in the North America, an air bag is required to be deployed at a vehicle crash in a state where an adult is seated on a passenger seat. In a case where a child seat is installed on the passenger seat to face the back of the vehicle so that an infant or a child faces a driver of the vehicle, the air bag is required not to be deployed. Therefore, correctly and appropriately determining the weight of the occupant is extremely important for a safety aspect.

JP09-207638A discloses an occupancy detection apparatus for determining whether or not an occupant is seated on a vehicle seat by detecting a load applied to the seat. According to the occupancy detection apparatus disclosed in JP09-207638A, two load sensors are arranged at two seat attachment portions among four seat attachment portions at which the seat is fixed to a vehicle floor. Specifically, one of the load sensors is provided at the seat attachment portion at a front side of the vehicle while the other of the load sensors is provided at the seat attachment portion at a rear side of the vehicle. Whether or not the occupant is seated on the seat is determined on a basis of a sum of two load values obtained from the two load sensors.

According to the occupancy detection apparatus disclosed in JP09-207638A, the load sensors may be provided at the left front and rear attachment portions or the right front and rear attachment portions, for example, so as to minimize the number of load sensors for determining whether or not the occupant is seated on the seat while reducing cost and weight of the apparatus.

Nevertheless, in a case where the load sensors are provided at the left front and rear attachment portions or the right front and rear attachment portions, the sum of the load values detected by the load sensors may fluctuate when the vehicle is driven around a corner, i.e., the vehicle is turning, which may result in a wrong determination of whether or not the occupant is seated on the seat. For example, in a case where two load sensors are provided at a front end and a rear end of an inner portion of a passenger seat in a width direction of the seat of a left-hand drive car, the sum of the load values detected by the load sensors may decrease due to a centrifugal force applied to the seat of the vehicle while the vehicle is turning left. Therefore, even when the adult is seated on the passenger seat, it is wrongly determined that no occupant is seated on the passenger seat.

A need thus exists for a seat occupancy determination apparatus which is not susceptible to the drawback mentioned above.

SUMMARY

According to an aspect of this disclosure, a seat occupancy determination apparatus includes a seat belt detection portion configured to detect an engagement of a tongue plate with a buckle of a seat belt, first and second load sensors arranged at one end of a lower side of a seat in a width direction thereof in a state where the first and second load sensors are positioned away from each other, each of the first and second load sensors detecting a portion of a load applied to the seat, a determination portion determining whether an occupancy state of the seat is an occupant seated state in which an occupant is seated on the seat or the occupancy state is a no occupant state in which the occupant is not seated on the seat, and a load decrease determination process portion determining a load decrease caused by a turning of the vehicle to inhibit a determination of the determination portion from being shifted to the no occupant state in a case where an inclination of a decrease of a load detected by the first and second load sensors is gentle in a state where the seat belt detection portion detects a disengagement state of the seat belt while the occupant seated state is determined by the determination portion, the load decrease determination process portion determining the load decrease caused by the occupant moving away from the seat and that the occupant is not seated on the seat in a case where the inclination of the decrease of the load detected by the first and second load sensors is steep.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A seat occupancy determination apparatus 10 for a vehicle seat 100 serving as a seat according to an embodiment will be explained with reference to the attached drawings. In the embodiment, directions and orientations, for example, front, rear, left, right, top, and bottom, correspond to those when viewed from an occupant seated on the vehicle seat 100. In addition, according to the embodiment, a vehicle to which the vehicle seat 100 is mounted is a left-hand drive car. Then, whether or not the occupant is seated on a passenger seat is determined according to the embodiment.

Figure 1:
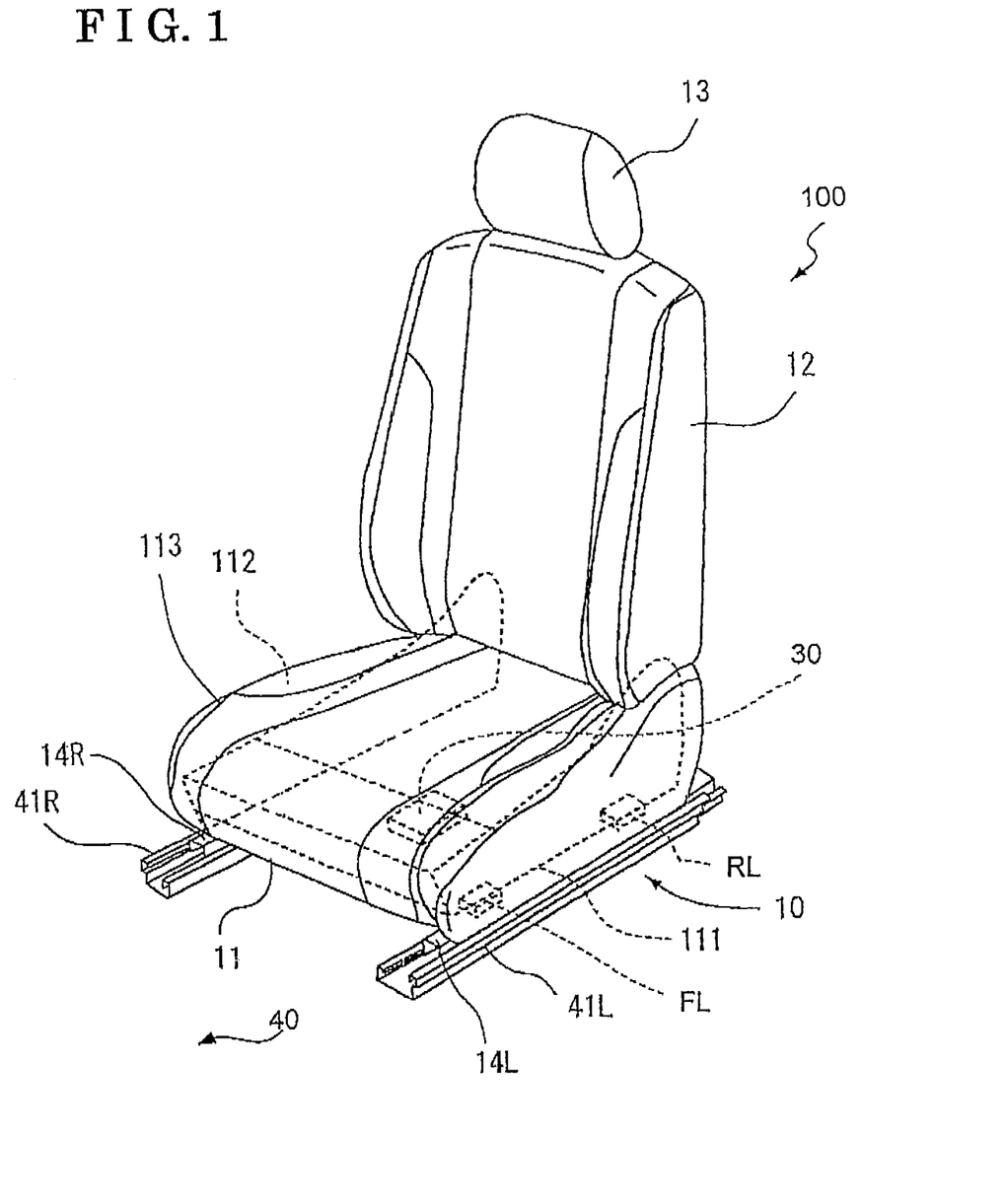
FIG. 1 is a perspective view of a vehicle seat where a seat occupancy determination apparatus according to an embodiment disclosed here is applied.

As illustrated in FIG. 1, the vehicle seat 100 serving as the passenger seat includes a seat cushion 11 on which the occupant is seated, and a seatback 12 serving as a backrest for the occupant and attached to a rear end portion of the seat cushion 11 so as to be rotatable in a front-rear direction of the vehicle (i.e., of the vehicle seat 100). In addition, a headrest 13 supporting the head portion of the occupant is attached to an upper edge of the seatback 12.

The seat cushion 11 includes a seat frame 111, a pad member 112 provided at an upper side of the seat frame 111, and a surface portion 113 covering a surface of the pad member 112. A pair of upper rails, i.e., left and right upper rails 14L and 14R, is attached to a lower surface of the seat frame 111. The left and right upper rails 14L and 14R engage with a pair of lower rails, i.e., left and right lower rails 41L and 41R, fixed to a vehicle floor 40 so as to be movable in the front-rear direction. Accordingly, the vehicle seat 100 is movable on the vehicle floor 40 in the front-rear direction and may be locked to a desired position by the occupant.

Figure 2:
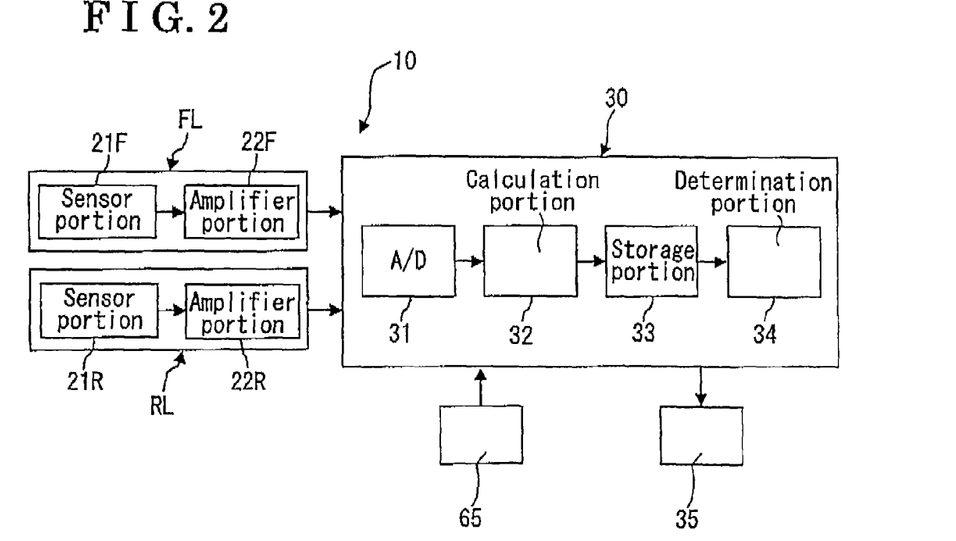
FIG. 2 is a block diagram of the seat occupancy determination apparatus according to the embodiment.

Next, the seat occupancy determination apparatus 10 will be explained below. The seat occupancy determination apparatus 10 includes a seat belt apparatus 60 (see FIG. 3) serving as a three-point seat belt (a seat belt). The seat belt apparatus 60 includes an ALR (Automatic Locking Retractor) mechanism. As illustrated in FIG. 2, the seat occupancy determination apparatus 10 includes a front load sensor FL serving as a first load sensor, a rear load sensor RL serving as a second load sensor, a buckle switch 65 serving as a seat belt detection portion, an airbag display lamp 35, and a controller 30.

The front and rear load sensors FL and RL are provided between the seat frame 111 and the left upper rail 14L in a vertical direction of the vehicle (i.e., of the vehicle seat 100). Specifically, the front and rear load sensors FL and RL are positioned close to a center of the vehicle in a width direction thereof in a state where the front and rear load sensors FL and RL are separated by a predetermined distance in the front-rear direction. The front load sensor FL is provided at a front side relative to a center of the seat cushion 11 in the front-rear direction while the rear load sensor RL is provided at a rear side relative to the center of the seat cushion 11 in the front-rear direction.

Each of the front and rear load sensors FL and RL is constituted by a strain gauge, for example. According to the embodiment, types, models, or detection principles, for example, are not specified.

The front load sensor FL is disposed between a front portion of the seat frame 111 and the left upper rail 14L to detect a front load value Ff applied to a front left portion of the seat cushion 11. In the same way, the rear load sensor RL is disposed between a rear portion of the seat frame 111 and the left upper rail 14L and is provided in the vicinity of a buckle 64 supported by the vehicle seat 100 to detect a rear load value Rf applied to a rear left portion of the seat cushion 11. The front load value Ff serves as a first load value while the rear load value Rf serves as a second load value.

Each of the front and rear load sensors FL and RL outputs a positive detection signal in a case where a load in a downward direction (i.e., a downward load) is applied to the seat cushion 11 by the occupant seated on the vehicle seat 100, for example. Each of the front and rear load sensors FL and RL outputs a negative detection signal in a case where a load in an upward direction (i.e., an upward load) is applied to the seat cushion 11. In a factory setting, a zero point adjustment is performed on each of the front and rear load sensors FL and RL.

As illustrated in FIG. 2, the front load sensor FL includes a sensor portion 21F and an amplifier portion 22F amplifying a detection signal generated by the sensor portion 21F. In addition, the rear load sensor RL includes a sensor portion 21R and an amplifier portion 22R amplifying a detection signal generated by the sensor portion 21R. Each of the sensor portions 21F and 21R is constituted by a Wheatstone bridge including four strain gauges.

The front and rear load sensors FL and RL are connected to the controller 30 to which the buckle switch 65 and the airbag display lamp 35, for example, are connected.

The controller 30 includes an A/D converter 31 performing a digital conversion on an analog detection signal from each of the front and rear load sensors FL and RL, and a calculation portion 32 inputting the detection signal from each of the front and rear load sensors FL and RL. The calculation portion 32 includes a front and rear total load value calculation portion for calculating a front and rear total load value (Ff+Rf) by adding the front load value Ff detected by the front load sensor FL and the rear load value Rf detected by the rear load sensor RL.

The controller 30 also includes a storage portion 33 storing various data for determining an occupancy state of the vehicle seat 100, for example, storing the front and rear total load value calculated by the calculation portion 32, and a determination portion 34 determining whether or not the occupant is seated on the vehicle seat 100 based on the various data stored in the storage portion 33. The front load value Ff, the rear load value Rf, and the front and rear total load value (Ff+Rf) are stored at the storage portion 33 and thereafter are transmitted to the determination portion 34.

The controller 30 inputs signals from the load sensors FL, RL and the buckle switch 65 (i.e., the seat belt detection portion) to determine the occupancy state of the vehicle seat 100. Specifically, the controller 30 determines, by means of determination processes which will be explained later, an "occupant seated state" in which the occupant is seated on the vehicle seat 100 or a "no occupant state" in which the occupant is not seated on the vehicle seat 100 to thereby control the airbag display lamp 35.

Figure 3:
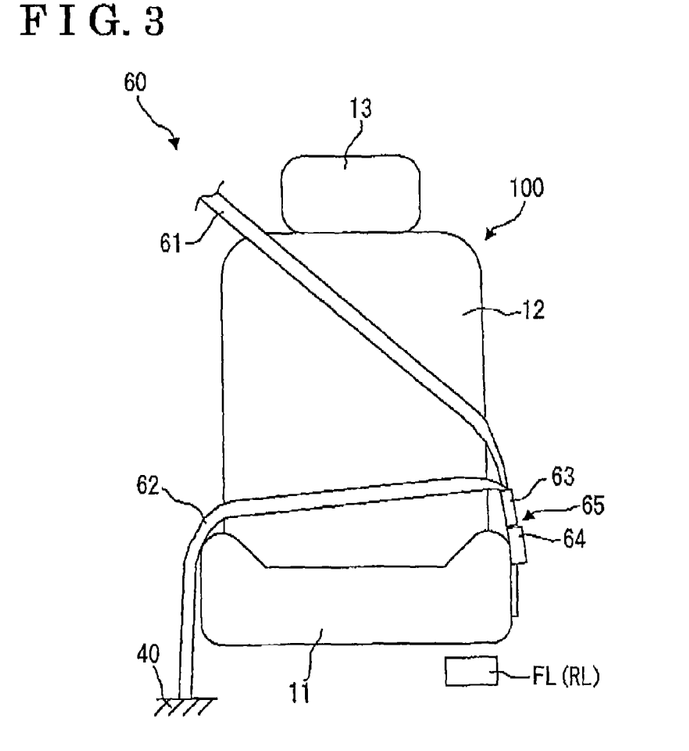
FIG. 3 is a front view of the vehicle seat while illustrating a seat belt detection portion according to the embodiment.

The seat belt apparatus 60 includes a shoulder strap 61 and a lap strap 62 connected to each other at respective ends by a tongue plate 63, and the buckle 64 as illustrated in FIG. 3. The buckle 64 engages with or disengages from the tongue plate 63 so as to form the buckle switch 65.

A retractor (i.e., a wind-up device) is arranged within a pillar that is positioned at a right side of the vehicle seat 100. An upper end of the shoulder strap 61 is connected to the retractor. The shoulder strap 61 is configured to be rolled out against a wind-up force of the retractor.

One end of the lap strap 62 is fixed to the vehicle floor 40 at a right side of the vehicle seat 100. The buckle 64, which is supported to a left rear side of the vehicle seat 100, includes a hole that opens upward. The tongue plate 63 connected to the shoulder strap 61 and the lap strap 62 is inserted into the hole of the buckle 64 to engage with the buckle 64.

According to the present embodiment, the buckle 64 is arranged at the same side of the vehicle seat 100 in the width direction as the side where the front and rear load sensors FL and RL are arranged. That is, the buckle 64 is fixed to one of side surfaces of the vehicle seat 100 while the front and rear load sensors FL and RL are arranged at one of side surfaces of the vehicle seat 100 where the buckle 64 is provided. Therefore, the front and rear load sensors FL and RL detect not only the weight of the occupant seated on the vehicle seat 100 but also the downward load applied to the buckle 64 and the upward load applied by the pulling of the seat belt apparatus 60 when the occupant fastens the seat belt apparatus 60.

Even in a case where a child seat is installed on the vehicle seat 100 and fixed by the seat belt apparatus 60, for example, it is determinable that the child seat is installed and secured to the vehicle seat 100 based on variations in load applied to the vehicle seat 100 that is caused by the seat belt apparatus 60.

In a case where the tongue plate 63 disengages from the buckle 64, the buckle switch 65 is in an open state, i.e., in an off state. When the tongue plate 63 engages with the buckle 64, the buckle switch 65 is brought to a closed state, i.e., to an on state so that the controller 30 detects that the seat belt apparatus 60 is fastened.

The seat occupancy determination apparatus 10 determines the occupant seated state (i.e., determines that the occupant is seated on the vehicle seat 100) in a case where an ignition is turned on and the buckle switch 65 is turned on so that the seat belt apparatus 60 is fastened.

In addition, the seat occupancy determination apparatus 10 determines the no occupant state (i.e., determines that the occupant is not seated on the vehicle seat 100) in a case where the buckle switch 65 is not turned on so that the seat belt apparatus 60 is not fastened, and a load input from the front and rear load sensors FL and RL, i.e., a load applied to the vehicle seat 100, is equal to or smaller than a predetermined value.

Specifically, the no occupant state is determined in a case where the buckle 64 disengages from the tongue plate 63 and a state where an input load (i.e., the front and rear total load value Ff+Rf) is greater than a first threshold value W1 and smaller than a second threshold value W2 continues for a predetermined time t1.

According to the present embodiment, the front and rear load sensors FL and RL are arranged at front and rear portions of only an inner side of the vehicle seat 100 in the width direction. Thus, outputs of the front and rear load sensors FL and RL may vary depending on whether the occupant is seated on the vehicle seat 100 or the occupant moves away from the vehicle seat 100 for getting-off from the vehicle, or depending on whether the vehicle turns left or right.

Specifically, in a case where the vehicle turns left, the vehicle seat 100 and the occupant seated on the vehicle seat 100 are pulled or thrown to the right by a centrifugal force so that the outputs of the front and rear load sensors FL and RL become small. On the other hand, in a case where the vehicle turns right, the outputs of the load sensors FL and RL become large.

In this case, as long as the occupant seated on the vehicle seat 100 fastens the seat belt apparatus 60, the determination of the occupant seated state is fixed and thus the determination is inhibited from being shifted to the no occupant state regardless of a decrease of the load detected by the load sensors FL and RL. On the other hand, in a case where the vehicle turns left in a state where the occupant on the vehicle seat 100 does not fasten the seat belt apparatus 60, the load detected by the load sensors FL and RL decreases. When a state where the load detected by the load sensors FL and RL is smaller than the second threshold value W2 continues for the predetermined time t1, it may be wrongly determined that no occupant is seated on the vehicle seat 100.

In a case where the wrong determination occurs as mentioned above, the determination is shifted from the occupant seated state to the no occupant state even though the occupant is seated on the vehicle seat 100. As a result, an apparatus for operating an airbag is turned off to thereby turn off the airbag display lamp 35 provided at a driver's seat. The airbag is inhibited from operating in a vehicle collision, for example. In order to inhibit the aforementioned wrong determination, it is necessary to distinguish between a load fluctuation (load decrease) by the vehicle turning left and a load fluctuation (load decrease) by the occupant moving away from the vehicle seat 100.

Figure 4:
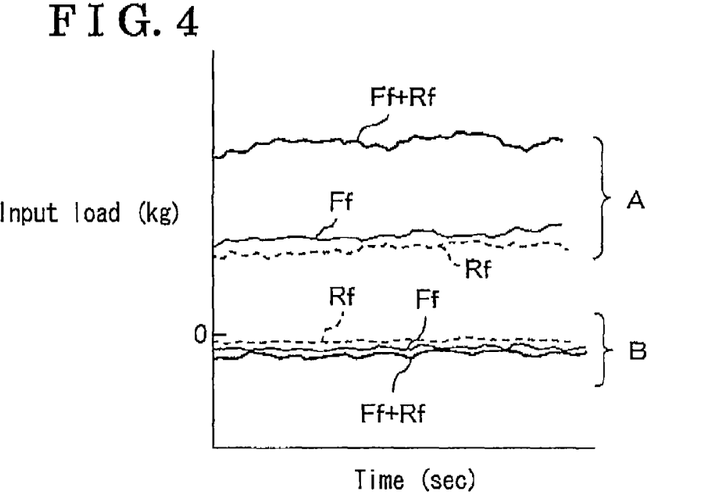
FIG. 4 is a graph illustrating experimental data of load fluctuation according to the embodiment.
Figure 5:
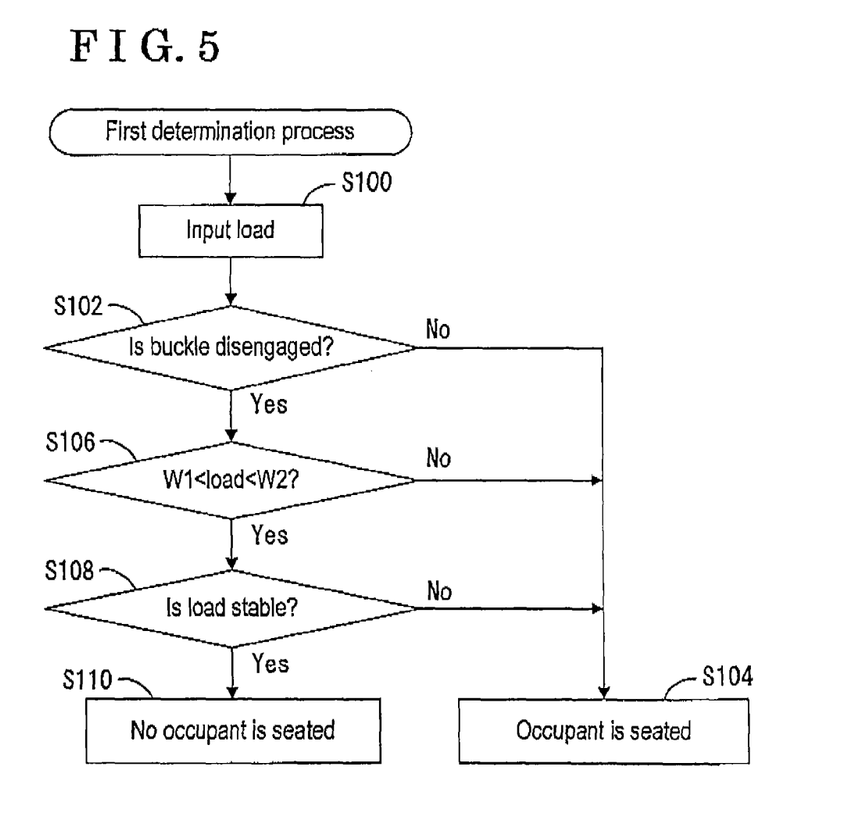
FIG. 5 is a flowchart illustrating a load fluctuation determination process (first determination process) according to the embodiment.

FIGS. 4 and 5 illustrate a first determination process serving as a load fluctuation determination process for inhibiting the wrong determination caused by the turning of the vehicle. In the first determination process, it is determined whether the load decrease is caused by the vehicle turning left or the occupant moving away from the vehicle seat 100 on a basis of whether or not the input load detected by the load sensors FL and RL is stable.

FIG. 4 illustrates a transition of the input load when the vehicle is turning and a transition of the input load when the vehicle is stopped. As illustrated by a portion A in FIG. 4, the load applied to a portion of the vehicle seat 100 at which the load sensors FL and RL are provided is released when the vehicle turns left so that the input load, i.e., the front and rear total load value Ff+Rf greatly decreases. At this time, the load detected by each of the front and rear load sensors FL and RL is not stable.

This is because a steering angle or a vehicle speed is difficult to be maintained constant while the vehicle is turning. In addition, the load fluctuation also occurs due to a concavity and convexity of a road surface. In FIG. 4, the value Ff is the input load detected by the front load sensor FL while the value Rf is the input load detected by the rear load sensor RL.

At a time when the occupant seated on the vehicle seat 100 gets off the vehicle, the vehicle is, of course, stopped. Thus, as illustrated by a portion B in FIG. 4, the front and rear total load value (Ff+Rf) decreases. At the same time, the front and rear load values Ff, Rf, and the front and rear total load value Ff+Rf are all stable. In a state where the vehicle is stopped, only the load fluctuation influenced by electrical noise and/or idling vibration is generated. Thus, an upper threshold value and a lower threshold value are specified for each of the load values so as only to permit the aforementioned load fluctuation influenced by electrical noise and/or idling vibration. As a result, it is determinable whether the load fluctuation is caused by the turning of the vehicle or the occupant getting off the vehicle.

That is, the determination of whether a fluctuation range of each of the front load value Ff detected by the front load sensor FL, the rear load value Rf detected by the rear load sensor RL, and the front and rear total load value Ff+Rf falls within a range of a predetermined threshold value may lead to distinguishing between the load decrease by the turning of the vehicle and the load decrease by the occupant getting off the vehicle.

Specifically, in a case where the fluctuation range of each of the front load value Ff and the rear load value Rf detected by the front and rear load sensors FL and RL falls within a fluctuation range ±Wa specified to permit a load fluctuation range by the electric noise and the idle vibration, and the front and rear total load value Ff+Rf falls within a getting-off determination load range ±Wb, the load decrease by the getting-off from the vehicle may be determined. Each of the fluctuation ranges ±Wa and ±Wb serves as the predetermined threshold value.

On the other hand, in a case where the front load value Ff or the rear load value Rf is out of the fluctuation range ±Wa, or in a case where the front and rear total load value Ff+Rf is out of the getting-off determination load range ±Wb, the load decrease by the turning of the vehicle may be determined.

In this case, the turning of the vehicle and the getting-off of the occupant from the vehicle may be distinguishable by at least one of the load fluctuations of the front and rear load values Ff and Rf, and the front and rear total load value Ff+Rf. At this time, however, even in a case where one of the front load value Ff and the rear load value Rf is a positive value while the other of the front load value Ff and the rear load value Rf is a negative value, the fluctuation range of the front and rear total load value Ff+Rf may fall within the range of the predetermined threshold value. Thus, the stability of at least one of the front load value Ff and the rear load value Rf, and the stability of the front and rear total load value Ff+Rf may be monitored or observed to thereby achieve more reliable determination.

FIG. 5 is a flowchart illustrating a flow of the first determination process performed by the determination portion 34 of the controller 30. The flow is repeated per predetermined time period.

In step S100 (hereinafter "step" will be omitted), the front load value Ff and the rear load value Rf detected by the front and rear load sensors FL and RL, and the front and rear total load value Ff+Rf calculated by the calculation portion 32 are input to the controller 30 (determination portion 34). In S102, it is determined whether or not the buckle 64 disengages from the tongue plate 63 (i.e., the seat belt apparatus 60 is unfastened or not). In a case where the positive determination is made in S102, i.e., the buckle 64 disengages from the tongue plate 63, the flow proceeds to S106. In a case where the negative determination is made in S102, i.e., the buckle 64 engages with the tongue plate 63, it is determined that the occupant is seated on the vehicle seat 100 in S104. The determination of the occupant seated state is fixed. As a result, the airbag display lamp 35 is maintained to be turned on.

In S106, it is determined whether or not the front and rear total load value (Ff+Rf) is greater than the first threshold value W1 and smaller than the second threshold value W2. In a case where the positive determination is made in S106, the flow proceeds to S108. In a case where the negative determination is made in S106, the flow proceeds to S104 to determine the occupant seated state.

In S108, it is determined whether or not a state where all the front load value Ff, the rear load value Rf, and the front and rear total load value Ff+Rf are stable continues for the predetermined time t1. In a case where the positive determination is made in S106, the flow proceeds to S110 where it is determined that the occupant gets off the vehicle. The determination is shifted from the occupant seated state to the no occupant state. In accordance with the shifting of the determination to the no occupant state, the airbag display lamp 35 is turned off.

Whether the load is stable or not is determined on a basis of whether or not the fluctuation range of each of the front toad value Ff and the rear load value Rf detected by the front and rear load sensors FL and RL falls within the fluctuation range ±Wa that is specified to allow the load fluctuation range by the electric noise and the idle vibration, and the front and rear total load value Ff+Rf falls within the getting-off determination load range ±Wb.

On the other hand, in a case where the front load value Ff or the rear load value Rf is out of the fluctuation range ±Wa or in a case where the front and rear total load value Ff+Rf is out of the getting-off determination load range ±Wb, it is determined that the load decreases is caused by the turning of the vehicle. Therefore, the determination is not shifted to the no occupant state and the airbag display lamp 35 is maintained to be turned on.

Accordingly, the determination of whether the load is stable or not may achieve the accurate determination of whether the load decrease is caused by the getting-off of the occupant from the vehicle or the turning of the vehicle. The load decrease by the turning of the vehicle is inhibited from being wrongly determined as the getting-off of the occupant from the vehicle. Unforeseen circumstances where the airbag is unable to operate even though the occupant is seated on the seat may be inhibited. Further, the getting-off of the occupant may be determined for a short time period, i.e., the predetermined time t1.

Next, a second determination process serving as a load decrease determination process for inhibiting the wrong determination caused by the turning of the vehicle will be explained with reference to FIGS. 6, 7, and 8. According to the second determination process, it is determined whether the load decrease is caused by the turning of the vehicle or the getting-off of the occupant from the vehicle on a basis of whether the inclination of the load decrease is gentle or steep.

Figure 6A:
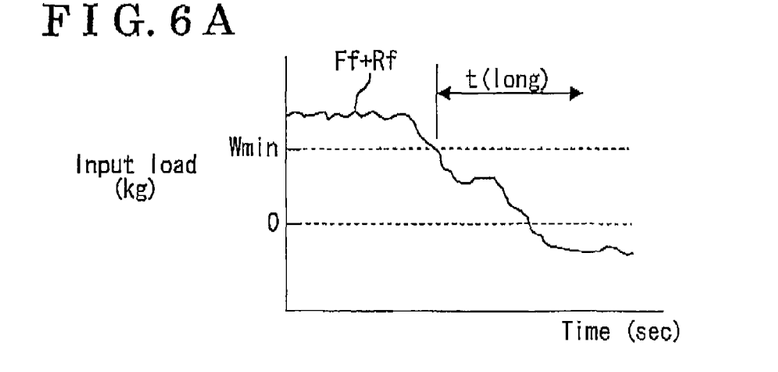
FIGS. 6A and 6B are graphs each illustrating experimental data of load decrease for a second determination process according to the embodiment.
Figure 6B:
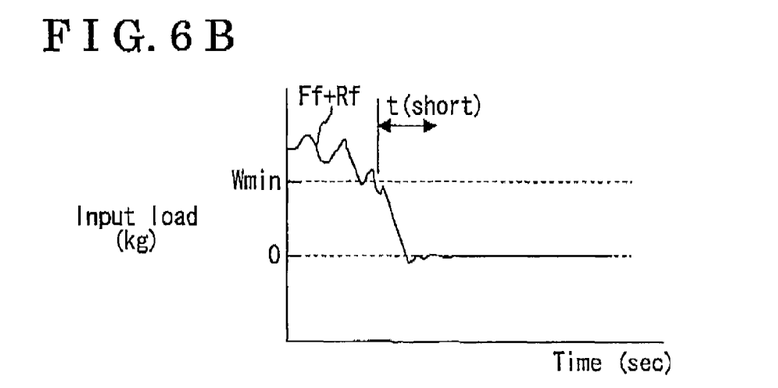
Figure 7:
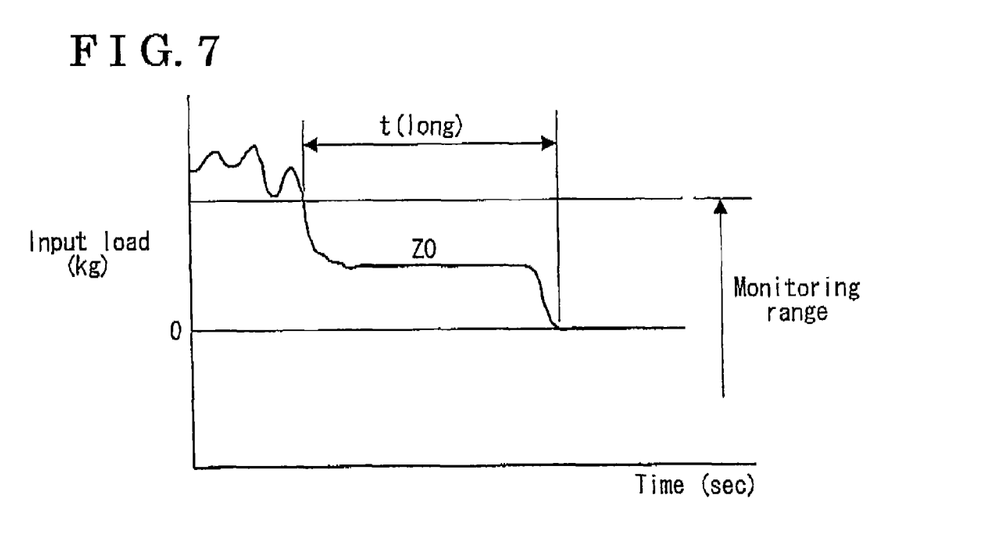
FIG. 7 is a graph illustrating another experimental data of load decrease for the second determination process according to the embodiment.

The inclination of the load decrease is generally gentle when the vehicle enters the curve or the vehicle turns, and a time period t during which the load is decreasing is long as illustrated in FIG. 6A. On the other hand, as illustrated in FIG. 6B, the inclination of the load decrease is relatively steep, and the time period t is short when the occupant gets off the vehicle, At this time, however, when the occupant slowly gets off the vehicle, the time period t may increase while an area Z0 where the load decrease is substantially stopped is generated in the middle of the load decrease as illustrated in FIG. 7. Therefore, whether the time period during which the load is decreasing is long or short may not accurately distinguish between the load decrease by the vehicle entering the curve and the load decrease by the getting-off of the occupant from the vehicle.

Therefore, in the following, a minimum load value (a minimum value) in association with the load decrease is updated, and whether the load decrease is caused by the turning of the vehicle or by the getting-off of the occupant from the vehicle is explicitly determined on a basis of the frequency of updating the minimum value.

The minimum value is updated in a following manner. Monitoring is started at a time when the detected load value becomes smaller than a third threshold value W3 specified beforehand so as to count the number of data in which the load decrease is equal to or greater than a predetermined load unit $\Delta W$. In a case where the count number during a predetermined time t2 from the start of monitoring is smaller than a predetermined number, it is determined that no occupant is seated on the vehicle seat 100. In a case where the count number is equal to or greater than the predetermined number, it is determined that the occupant is seated on the vehicle seat 100.

Details of updating the minimum value will be explained on a basis of a flowchart illustrated in FIG. 8.

In S200, the load value, i.e., an input load Wn=Ff+Rf, detected by the load sensors FL and RL and calculated by the calculation portion 32, is input to the controller 30 (determination portion 34). In S202, it is determined whether or not the buckle 64 disengages from the tongue plate 63 (i.e., the seat belt apparatus 60 is unfastened or not). When the positive determination is made in S202, the flow proceeds to S204. When the negative determination is made in S202, it is determined that the occupant is seated on the vehicle seat 100 in S220. The determination of the occupant seated state is fixed.

On the other hand, in a case where the buckle 64 disengages from the tongue plate 63, it is determined in S204 that whether the input load Wn decreases to or below (or decreases below) the third threshold value W3. When the positive determination is made in S204, the flow proceeds to S206 to start monitoring the input load Wn in a state where the third threshold value W3 serves as an initial value of a minimum value Wmin. When the negative determination is made in S204, it is determined that the occupant is seated on the vehicle seat 100 in S222.

In S206, it is determined whether or not a value obtained by subtracting the input load Wn from the minimum value Wmin which is initially the third threshold value W3 is greater than the predetermined load unit ΔW. When the decrease of the input load Wn is equal to or smaller than the predetermined load unit ΔW, the flow proceeds to S208 in which the updating of the minimum value is not performed and a program of the second determination process is returned.

On the other hand, when it is determined that the input load Wn decreases by more than the predetermined load unit ΔW relative to the minimum value Wmin, the flow proceeds to S210 in which the minimum value Wmin is updated. That is, the value obtained by subtracting the predetermined load unit ΔW from the minimum value Wmin (i.e., W3−ΔW) is stored as the new minimum value Wmin.

Next in S212, a counter value N of a counter provided at the storage portion 33 of the controller 30 is incremented by one (i.e., N=N+1) each time the minimum value Wmin is updated to thereby count the frequency of updating the minimum value.

In S214, it is determined whether or not the frequency of updating the minimum value is smaller than a predetermined frequency. When the positive determination is made in S214, the flow proceeds to S224 to determine that the occupant is not seated on the vehicle seat 100. That is, because the decrease of the load value is steep as illustrated in FIG. 6B, it is determined that the load decrease is caused by the getting-off of the occupant. The determination is thus shifted from the occupant seated state to the no occupant state to therefore turn off the airbag display lamp 35.

On the other hand, in a case where the negative determination is made in S214, the flow proceeds to S226 where the determination of the occupant seated state is maintained because the load decrease is gentle as illustrated in FIG. 6A and thus the load decrease is caused by the turning of the vehicle.

Accordingly, the monitoring is started at a time when the detected load (i.e., the front and rear total load value) becomes equal to or smaller than the minimum value Wmin, and the minimum value Wmin is appropriately sequentially updated. Then, the frequency of updating the minimum value when a state where the load is greater than the first threshold value W1 and smaller than the second threshold value W2 continues for the predetermined time t2 is compared to the predetermined frequency to thereby determine whether the decrease of the load is caused by the turning of the vehicle or by the getting-off of the occupant from the vehicle.

According to the aforementioned process for updating the minimum value, even in a case where a time period during which the load decreases is elongated because the occupant slowly gets off the vehicle so that the load decrease is substantially stopped, the load decrease by the getting-off of the occupant from the vehicle may be clearly distinguished from the load decrease by the turning of the vehicle, which may inhibit the wrong determination. In addition, the determination of the getting-off of the occupant from the vehicle is performed within a relatively short time period, i.e., within the predetermined time t2. Thus, the driver of the vehicle may be inhibited from being concerned about a breakage of the airbag because the airbag display lamp 35 is kept turning on even though the occupant gets off the vehicle.

Figure 9:
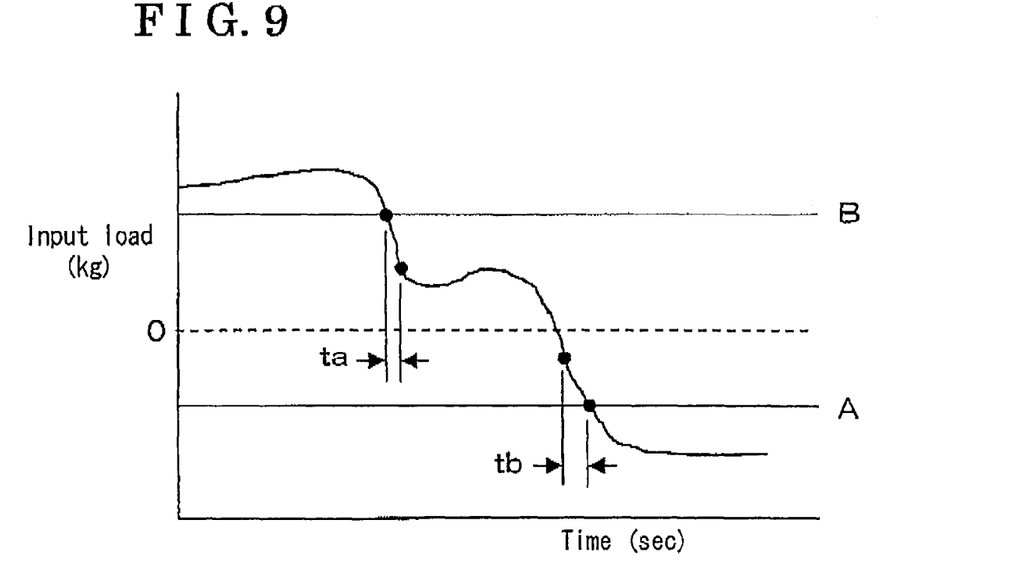
FIG. 9 is a diagram illustrating a first modified example of the second determination process according to the embodiment.
Figure 10:
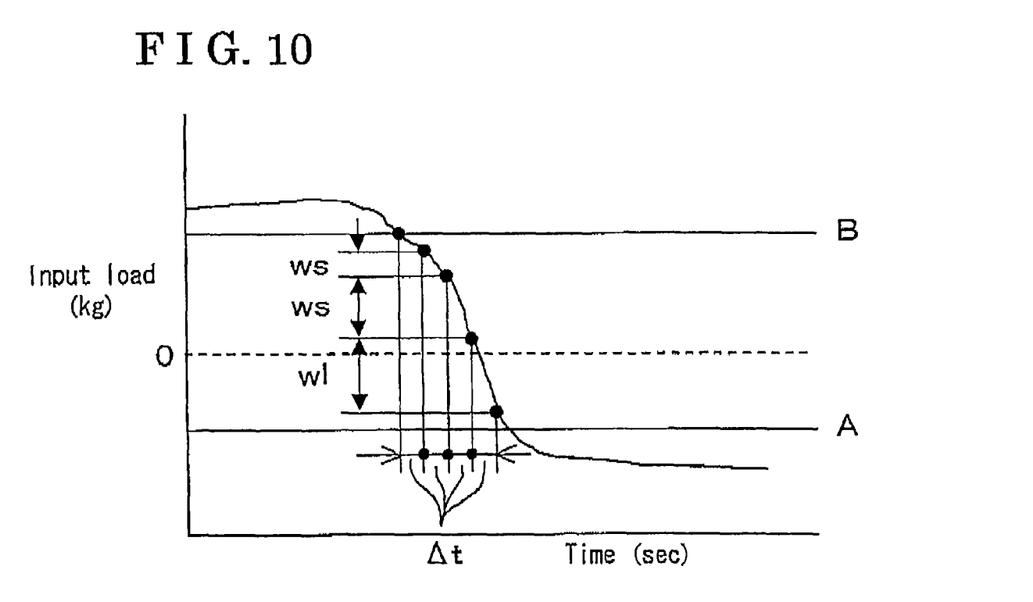
FIG. 10 is a diagram illustrating a second modified example of the second determination process according to the embodiment.

A configuration for determining whether the load decrease is gentle or steep is not limited to updating the minimum value and may be achieved as illustrated in FIGS. 9 and 10.

FIG. 9 illustrates a first modified example of the second determination process. According to the first modified example of the second determination process, time during which the load is decreasing is identified to thereby determine whether the load decrease is caused by the turning of the vehicle or by the getting-off of the occupant from the vehicle. Specifically, a range where the load is greater than a threshold value A and smaller than a threshold value B is specified to be a monitoring range where time ta, time tb, time tc, and so forth, in which the load decreases by a predetermined load unit or more, are measured and accumulated. In a case where the accumulated time is within a predetermined time, it is determined that the load decreases steeply and therefore the load decrease is caused by the getting-off of the occupant from the vehicle. On the other hand, in a case where the accumulated time is over the predetermined time, it is determined that the load decreases gently and therefore the load decrease is caused by the turning of the vehicle.

FIG. 10 illustrates a second modified example of the second determination process. According to the second modified example of the second determination process, the inclination of the load decrease is identified to thereby determine whether the load decrease is caused by the turning of the vehicle or by the getting-off of the occupant from the vehicle.

In this case, in the same way as the first modified example, the range where the load is greater than the threshold value A and smaller than the threshold value B is specified to be the monitoring range where it is determined whether or not the load decrease equal to or greater than a predetermined load occurs within a time Δt. In a case where the load decrease equal to or greater than the predetermined load occurs, i.e., a case illustrated by "wl" in FIG. 10, it is determined that the load decreases steeply and therefore the load decrease is caused by the getting-off of the occupant from the vehicle. Otherwise, i.e., in cases illustrated by "ws" in FIG. 10, it is determined that the load decreases gently and therefore the load decrease is caused by the turning of the vehicle.

Accordingly, the second determination process for determining whether the load decrease is caused by the turning of the vehicle or by the getting-off of the occupant from the vehicle on a basis of whether the load decrease is gentle or steep is not limited to the updating of the minimum value and may be achieved by various methods.

Figure 11A:
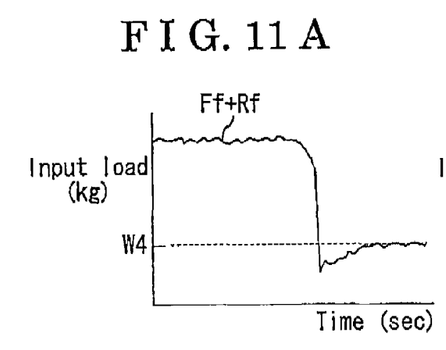
FIGS. 11A and 11B are graphs each illustrating experimental data of negative load for a third determination process according to the embodiment.
Figure 11B:
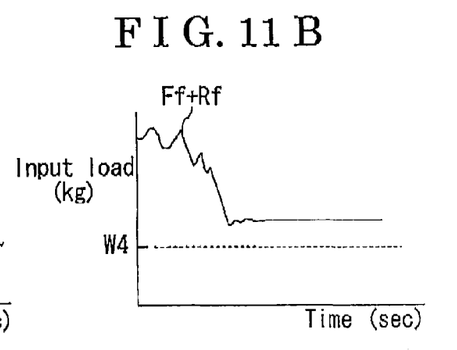

Next, a third determination process serving as a negative load determination process for inhibiting the wrong determination caused by the turning of the vehicle will be explained with reference to FIGS. 11 and 12. According to the third determination process, the load decrease by the turning of the vehicle is determined on a basis of the fact that, when a steering wheel is turned sharply, the occupant bounces and moves in a direction opposite from a direction in which the steering wheel is turned, so that a large negative load (i.e., a large load in negative value) which is not generated by the getting-off of the occupant from the vehicle is detected.

That is, when the vehicle starts turning to the left, the weight of the occupant is applied to the right end of the vehicle seat 100. Thus, as illustrated in FIG. 11A, the input load decreases rapidly to cause the input of the large negative load that may not be generated by the getting-off of the occupant from the vehicle. On the other hand, as illustrated in FIG. 11B, the input load decreases to approximately zero when the occupant gets off the vehicle and the large negative load is inhibited from being detected.

Accordingly, a fourth threshold value W4 is specified on a basis of the negative load value that may be only generated when the vehicle starts turning at a high g-force. Then, whether or not the input load becomes smaller than the fourth threshold value W4 (the negative load value) may achieve the determination of the load decrease by the turning of the vehicle.

Figure 12:
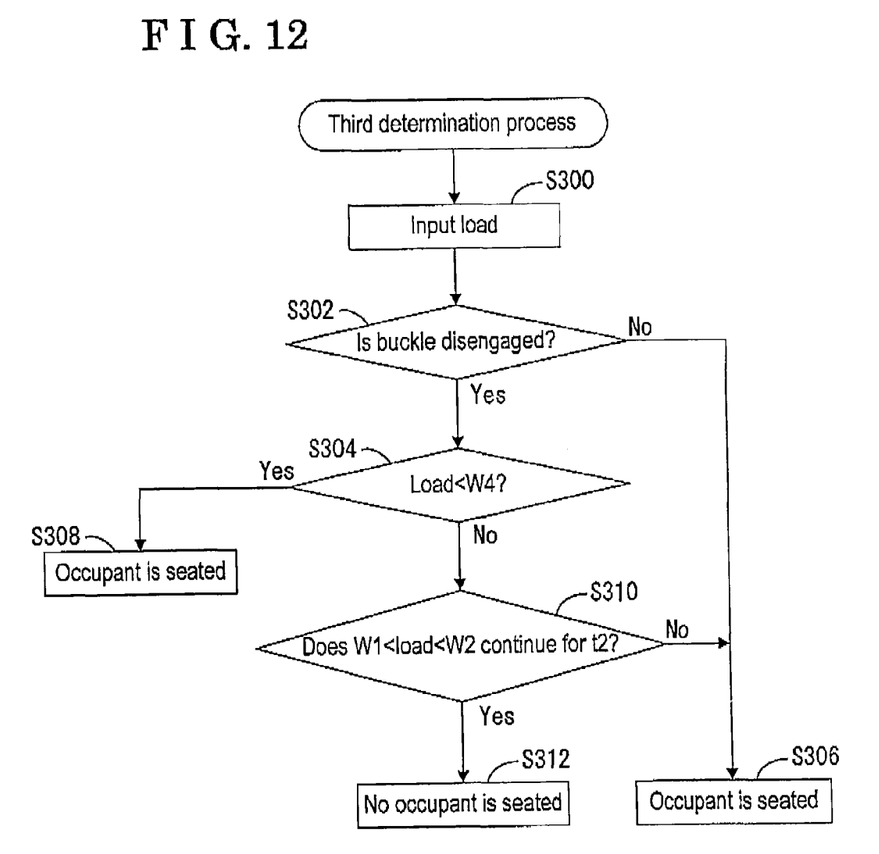
FIG. 12 is a flowchart illustrating a negative load determination process (third determination process) according to the embodiment.

FIG. 12 illustrates a flowchart of the third determination process. In S300, the input load (Ff+Rf) is input. In S302, it is determined whether or not the buckle 64 disengages from the tongue plate 63 (i.e., the seat belt apparatus 60 is unfastened or not). In a case where the positive determination is made in S302, the flow proceeds to S304. In a case where the negative determination is made in S302, the flow proceeds to S306 in which it is determined that the occupant is seated on the vehicle seat 100 so that the determination of the occupant seated state is fixed.

In S304, it is determined whether or not the input load is smaller than the fourth threshold value W4. When the positive determination is made in S304, the determination of the occupant seated state is continued in S308 because it is determined that the load decrease is caused by a sharp turning of the steering wheel (i.e., the vehicle turns sharply). The third determination process is immediately terminated without waiting the elapse of the predetermined time t2.

In a case where the negative determination is made in S304, it is determined in S310 that whether or not the state where the input load (Ff+Rf) is greater than the first threshold value W1 and smaller than the second threshold value W2 continues for the predetermined time t2. When the positive determination is made in S310, it is determined that the occupant is not seated on the vehicle seat 100 so that the determination is shifted from the occupant seated state to the no occupant seated state in S312. On the other hand, when the negative determination is made in S310, the flow proceeds to S306 in which the occupant seated state is determined.

According to the present embodiment, as explained in the first determination process, it is determined whether or not the load decrease is caused by the turning of the vehicle to the left or by the getting-off of the occupant from the vehicle, on a basis of whether or not the load is stable (i.e., the load fluctuation is small) during the predetermined time t1. In a case where it is determined that the load decrease is caused by the getting-off of the occupant from the vehicle, the determination is shifted to the no occupant state while the airbag display lamp 35 which is turned on when the occupant seated state is determined is turned off.

Nevertheless, the determination may be inhibited from being shifted to the no occupant state in the first determination process. Therefore, in parallel with the first determination process, the second determination process is performed so as to determine whether or not the load decrease is caused by the turning of the vehicle or by the getting-off of the occupant from the vehicle on a basis of whether or not the inclination of the load decrease is gentle or steep during the predetermined time t2. In a case where it is determined that the bad decrease is caused by the getting-off of the occupant from the vehicle, the determination is shifted to the no occupant state while the airbag display lamp 35 is turned off.

Further, the determination may be inhibited from being shifted to the no occupant state in the second determination process. Therefore, in parallel with the first and second determination processes, the third determination process is performed so as to determine whether or not the load decrease is caused by the turning of the vehicle or by the getting-off of the occupant from the vehicle on a basis of whether or not the large negative load is detected during the predetermined time t2. In a case where it is determined that the load decrease is caused by the getting-off of the occupant from the vehicle, the determination is shifted to the no occupant state while the airbag display lamp 35 is turned off.

In a case where each of the first to third determination processes is not established, i.e., the getting-off of the occupant from the vehicle is not determined even though the occupant gets off the vehicle, the airbag display lamp 35 is constantly turned on, which may cause a vehicle driver to feel anxiety that the airbag display lamp 35 and the airbag may be broken.

Thus, the condition for certainly shifting the determination to the no occupant state after the occupant gets off the vehicle may be desirably specified so that the airbag display lamp 35 is inhibited from keeping turned on after the occupant gets off the vehicle.

Therefore, according to a fourth determination process serving as an occupant getting-off determination process, the getting-off of the occupant is determined in a case where the state in which the buckle 64 disengages from the tongue plate 63 and the input load (Ff+Rf) is equal to or smaller than a fifth threshold value serving as a predetermined load value continues for a predetermined time t3 serving as a predetermined time period. Then, the determination is shifted from the occupant seated state to the no occupant state.

Accordingly, even in a severe getting-off mode of the occupant from the vehicle, the determination is securely shifted to the no occupant state after the predetermined time t3. The severe getting-off mode includes a case where the detected load value becomes unstable because of a strong wind even though the occupant gets off the vehicle and thus the getting-off of the occupant from the vehicle is not determined, and a case where the occupant slowly gets off the vehicle or the occupant gets off the vehicle while applying the load to the right end of the seat and thus the getting-off of the occupant from the vehicle is not determined, for example.

Then, the first to fourth determination processes are performed under OR conditions so that, in many circumstances, the determination is shifted to the no occupant state within the predetermined time t1 or t2, or, even in a worst case, the determination is securely shifted to the no occupant state after the predetermined time t3. As a result, the vehicle driver may be inhibited from having an uncomfortable feeling.

Figure 13:
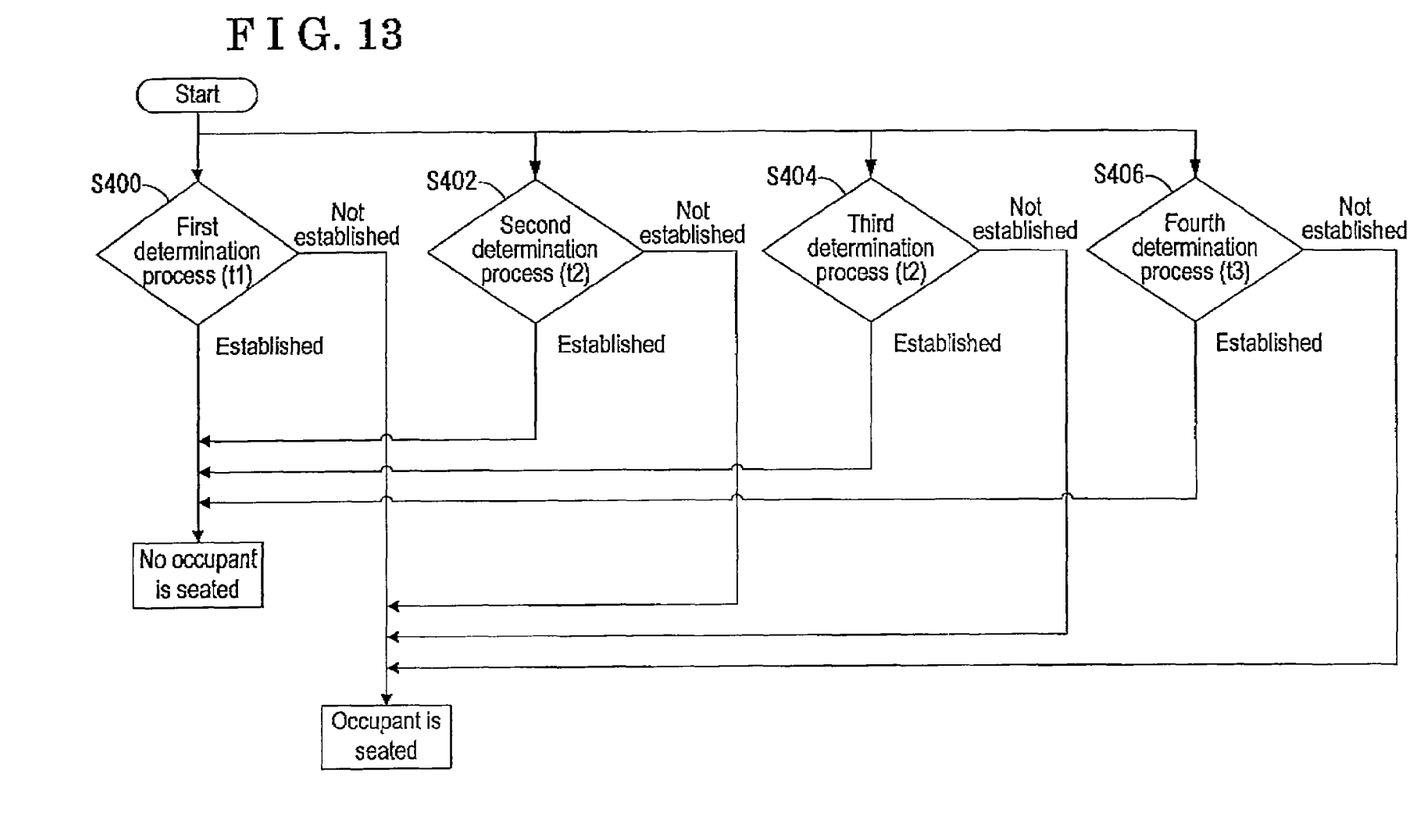
FIG. 13 is a flowchart entirely illustrating the first to fourth determination processes according to the embodiment.

FIG. 13 is a flowchart for determining the occupant seated state and the no occupant state by performing the first to fourth determination processes simultaneously and in parallel with one another by the determination portion 34 of the controller 30 per predetermined time.

In a case where the flow in FIG. 13 is started under the condition that the occupant is seated on the vehicle seat 100 and the airbag display lamp 35 is turned on, a program of the first determination process as illustrated in FIG. 5 is performed in S400. Specifically, in S400, it is determined whether or not a condition is satisfied, the condition including that the buckle 64 disengages from the tongue plate 63, the input load (Ff+Rf) falls within the range greater than the first threshold value W1 and smaller than the second threshold value W2, and the state in which the fluctuation range of the load value (Ff, Rf, Ff+Rf) is within the predetermined fluctuation range ±Wa or ±Wb, which serves as the condition for the load stability, continues for the predetermined time t1. In a case where the aforementioned condition is satisfied, it is determined that the occupant gets off the vehicle so that the determination is shifted to the no occupant state and the airbag display lamp 35 is turned off. On the other hand, in a case where the condition is not satisfied, it is determined that the load decrease is caused by the turning of the vehicle so that the determination is inhibited from being shifted to the no occupant state and the airbag display lamp 35 is kept turned on.

Figure 8:
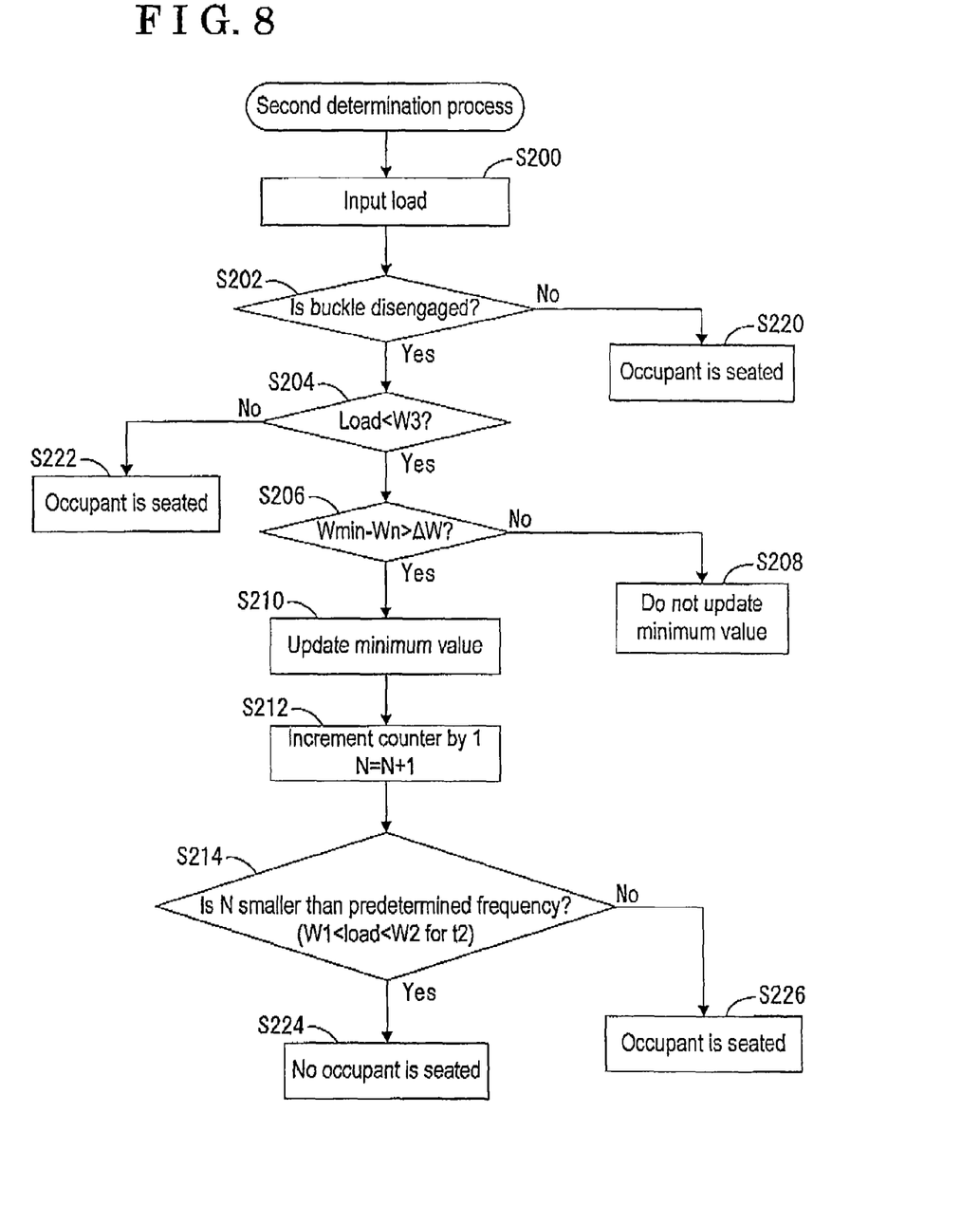
FIG. 8 is a flowchart illustrating a load decrease determination process (second determination process) according to the embodiment.

In S402, a program of the second determination process as illustrated in FIG. 8 is performed. Specifically, in S402, it is determined whether or not a condition is satisfied, the condition including that the buckle 64 disengages from the tongue plate 63, the input load falls within the range greater than the first threshold value W1 and smaller than the second threshold value W2, and the frequency of updating the minimum value is smaller than the predetermined frequency.

In a case where the aforementioned condition is satisfied, it is determined that the load decrease is caused by the occupant getting off the vehicle so that the determination is shifted to the no occupant state and the airbag display lamp 35 is turned off. On the other hand, in a case where the condition is not satisfied, it is determined that the load decrease is caused by the turning of the vehicle so that the determination is inhibited from being shifted to the no occupant state and the airbag display lamp 35 is kept turned on.

In S404, a program of the third determination process as illustrated in FIG. 12 is performed. Specifically, in S404, it is determined whether or not a condition is satisfied, the condition including that the buckle 64 disengages from the tongue plate 63, the input load falls within the range greater than the first threshold value W1 and smaller than the second threshold value W2, and the large negative load (equal to or smaller than the fourth threshold value W4) which may not be input when the occupant gets off the vehicle is not input within the predetermined time t2. In a case where the aforementioned condition is satisfied, it is determined that the occupant gets off the vehicle so that the determination is shifted to the no occupant state and the airbag display lamp 35 is turned off. On the other hand, in a case where the large negative load is input, it is determined that the vehicle is turning so that the determination of the occupant seated state is fixed. The flow illustrated in FIG. 13 is immediately terminated.

In S406, a program of the fourth determination process is performed. In S406, in order to avoid the airbag display lamp 35 from keeping turned on after the occupant gets off the vehicle, the determination is shifted to the no occupant state and the airbag display lamp 35 is turned off in a case where the buckle 64 disengages from the tongue plate 63 and the state in which the input load (Ff+Rf) is equal to or smaller than the fifth threshold value continues for the predetermined time t3.

Accordingly, even in the severe getting-off mode of the occupant from the vehicle, for example, the load is unstable because of strong wind so that the getting-off of the occupant is not determined in the first determination process, the occupant slowly gets off the vehicle so that the getting-off of the occupant is not determined in the second determination process, or the occupant gets off the vehicle while applying the load to the right end of the vehicle seat 100 so that the getting-off of the occupant is not determined in the third determination process, the determination may be shifted to the no occupant state after the elapse of the predetermined time t3 even in the worst case.

As a result, the determination is shifted to the no occupant state after the elapse of the predetermined time t3 at the latest from the getting-off of the occupant from the vehicle to thereby turn off the airbag display lamp 35. Accordingly, the vehicle driver may be inhibited from feeling anxiety that the airbag display lamp 35 is possibly broken because the airbag display lamp 35 is kept turning on even after the occupant gets off the vehicle.

S400 constitutes a first determination process portion, i.e., a load fluctuation determination process portion, while S402 constitutes a second determination process portion, i.e., a load decrease determination process portion. In addition, S404 constitutes a third determination process portion, i.e., a negative load determination process portion, while S406 constitutes a fourth determination process portion, i.e., an occupant getting-off determination process portion serving as an occupant moving-away determination process portion.

According to the present embodiment, even in a case where the buckle 64 disengages from the tongue plate 63 and the input load is greater than the first threshold value W1 and smaller than the second threshold value W2, the load decrease determination process portion determines the load decrease caused by the turning of the vehicle when the input load decreases gently. Consequently, the decrease of the input load by the turning of the vehicle may be inhibited from being wrongly determined as the no occupant state by the getting-off of the vehicle.

According to the present embodiment, even in a case where the buckle 64 disengages from the tongue plate 63 and the input load is greater than the first threshold value W1 and smaller than the second threshold value W2, the negative load determination process portion determines the load decrease caused by the turning of the vehicle when the large negative load, which may not be generated upon getting-off of the occupant from the vehicle, is input. Consequently, the decrease of the input load by the turning of the vehicle may be inhibited from being wrongly determined as the no occupant state by the getting-off of the vehicle.

Further, according to the present embodiment, in a case where the buckle 64 disengages from the tongue plate 63 and the state in which the input load is smaller than the fifth threshold value continues for the predetermined time t3 when the getting-off of the occupant from the vehicle is not determined by the load decrease determination process portion and the negative load determination process portion, the determination is shifted to the no occupant state. Consequently, the airbag display lamp 35 is avoided to be turned on for a long time period after the occupant gets off the vehicle.

According to the aforementioned embodiment, the front load sensor FL and the rear load sensor RL are separately arranged at the front and rear portions of the inner side of the passenger seat for a left-hand drive car. Alternatively, the front load sensor FL and the rear load sensor RL may be separately arranged at the front and rear portions of the inner side of the passenger seat for a right-hand drive car. In this case, the load value detected by the load sensors FL and RL decreases when the vehicle is turning to the right. In addition, the load sensors FL and RL may be separately arranged at the front and rear portions of an outer side (i.e., close to a window) of the passenger seat.

According to the aforementioned embodiment, in a case where the load detected by the front and rear load sensors FL and RL decreases in a state where the seat belt apparatus 60 is not fastened, it may be securely determined whether the load decrease is caused by the turning of the vehicle or the getting-off of the occupant from the vehicle on a basis of whether the inclination of the load decrease is gentle or steep.

Thus, even in a case where the front and rear load sensors FL and RL are provided at the front and rear portions of either side of the vehicle seat 100 in the width direction, the wrong determination that the occupant gets off the vehicle is inhibited, which keeps the airbag display lamp 35 to be turned on. The airbag is operated in a vehicle collision to securely protect the occupant of the vehicle. In addition, a reduction of the number of load sensors may achieve a reduction of cost and weight of the seat occupancy determination apparatus.

According to the aforementioned embodiment, the seat occupancy determination apparatus includes the negative load determination process portion (S404) determining the load decrease caused by the turning of the vehicle to inhibit the determination of the determination portion 34 from being shifted to the no occupant state in a case where the negative load is detected by the front and rear load sensors FL and RL while the occupant seated state is determined by the determination portion 34.

Accordingly, in a case where the load detected by the front and rear load sensors FL and RL is the negative value, it may be securely determined that the load decrease is caused by the turning or sharp turning of the vehicle to thereby inhibit the wrong determination that the occupant gets off the vehicle, even in a state where the seat belt apparatus 60 is not fastened.

In addition, according to the aforementioned embodiment, the seat occupancy determination apparatus includes the occupant getting-off determination process portion (occupant moving-away determination process portion) (S406) causing the determination of the determination portion 34 to be shifted to the no occupant state in a case where the determination of the determination portion 34 is inhibited from being shifted to the no occupant state by the load decrease determination process portion (S402) and the negative load determination process portion (S404), and the load value detected by the front and rear load sensors FL and RL is equal to or smaller than the fifth threshold value for the predetermined time t3.

Accordingly, even in a case where the getting-off of the occupant from the vehicle is not determined by the load fluctuation determination process portion (S400), the load decrease determination process portion (S402), and the negative load determination process portion (S404), the occupant getting-off determination process portion (S406) may determine the getting-off of the occupant from the vehicle.

Further, according to the aforementioned embodiment, the load decrease determination process portion (S402) starts monitoring the decrease of the load detected by the front and rear load sensors FL and RL in a case where the load value detected by the front and rear load sensors FL and RL is smaller than the minimum value that is specified at the time to count the number of data in which the decrease of the load is equal to or greater than the predetermined load unit $\Delta W$ and to update the minimum value, the load decrease determination process portion (S402) determining whether the inclination of the decrease of the load is gentle or steep on a basis of the counted number of data.

Accordingly, even in a case where an area in which the load decrease is substantially stopped is generated in the middle of the getting-off of the occupant from the vehicle, the getting-off of the occupant from the vehicle may be securely determined without being wrongly determined as the turning of the vehicle.

Further, according to the aforementioned embodiment, the buckle 64 is fixed to one of side surfaces of the vehicle seat 100 in the width direction while the front and rear load sensors FL and RL are arranged at the one of side surfaces of the vehicle seat 100 where the buckle 64 is provided.

Accordingly, the front and rear load sensors FL and RL detect not only the load applied when the occupant is seated on the vehicle seat 100 but also variations in load applied to the buckle 64 when the occupant is fastening or engaging the seat belt apparatus 60 and variations in load applied by the occupant pulling the seat belt apparatus 60 in a state where the seat belt apparatus 60 is fastened.

Consequently, in a case where a child seat is installed on the vehicle seat 100 and fixed by the seat belt apparatus 60, for example, it is determinable that the child seat is installed and secured to the vehicle seat 100 based on variations in load applied to the vehicle seat 100 that is caused by the seat belt apparatus 60.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat occupancy determination apparatus comprising:
a seat belt detection portion configured to detect an engagement of a tongue plate with a buckle of a seat belt;
first and second load sensors arranged at one end of a lower side of a seat in a width direction thereof in a state where the first and second load sensors are positioned away from each other, each of the first and second load sensors detecting a portion of a load applied to the seat;
a determination portion determining whether an occupancy state of the seat is an occupant seated state in which an occupant is seated on the seat or the occupancy state is a no occupant state in which the occupant is not seated on the seat;
a load decrease determination process portion determining a load decrease caused by a turning of the vehicle to inhibit a determination of the determination portion from being shifted to the no occupant state in a case where an inclination of a decrease of a load detected by the first and second load sensors is gentle in a state where the seat belt detection portion detects a disengagement state of the seat belt while the occupant seated state is determined by the determination portion, the load decrease determination process portion determining the load decrease caused by the occupant moving away from the seat and that the occupant is not seated on the seat in a case where the inclination of the decrease of the load detected by the first and second load sensors is steep;

a negative load determination process portion determining the load decrease caused by the turning of the vehicle to inhibit the determination of the determination portion from being shifted to the no occupant state in a case where a negative load is detected by the first and second load sensors while the occupant seated state is determined by the determination portion; and an occupant moving-away determination process portion causing the determination of the determination portion to be shifted to the no occupant state in a case where the determination of the determination portion was inhibited from being shifted to the no occupant state by the load decrease determination process portion and the negative load determination process portion, and a load value detected by the first and second load sensors is equal to or smaller than a predetermined load value for a predetermined time period.

2. A seat occupancy determination apparatus comprising:

a seat belt detection portion configured to detect an engagement of a tongue plate with a buckle of a seat belt;

first and second load sensors arranged at one end of a lower side of a seat in a width direction thereof in a state where the first and second load sensors are positioned away from each other, each of the first and second load sensors detecting a portion of a load applied to the seat;

a determination portion determining whether an occupancy state of the seat is an occupant seated state in which an occupant is seated on the seat or the occupancy state is a no occupant state in which the occupant is not seated on the seat; and a load decrease determination process portion determining a load decrease caused by a turning of the vehicle to inhibit a determination of the determination portion from being shifted to the no occupant state in a case where an inclination of a decrease of a load detected by the first and second load sensors is gentle in a state where the seat belt detection portion detects a disengagement state of the seat belt while the occupant seated state is determined by the determination portion, the load decrease determination process portion determining the load decrease caused by the occupant moving away from the seat and that the occupant is not seated on the seat in a case where the inclination of the decrease of the load detected by the first and second load sensors is steep, wherein the load decrease determination process portion starts monitoring the decrease of the load detected by the first and second load sensors in a case where a load value detected by the first and second load sensors is smaller than a minimum value that is specified at the time to count the number of data in which the decrease of the load is equal to or greater than a predetermined load unit and to update the minimum value, the load decrease determination process portion determining whether the inclination of the decrease of the load is gentle or steep on a basis of the counted number of data.

3. The seat occupancy determination apparatus according to claim 1, wherein the load decrease determination process portion starts monitoring the decrease of the load detected by the first and second load sensors in a case where a load value detected by the first and second load sensors is smaller than a minimum value that is specified at the time to count the number of data in which the decrease of the load is equal to or greater than a predetermined load unit and to update the minimum value, the load decrease determination process portion determining whether the inclination of the decrease of the load is gentle or steep on a basis of the counted number of data.

4. The seat occupancy determination apparatus according to claim 1, wherein the buckle is fixed to one of side surfaces of the seat in the width direction while the first and second load sensors are arranged at the one of side surfaces of the seat where the buckle is provided.

5. The seat occupancy determination apparatus according to claim 2, wherein the buckle is fixed to one of side surfaces of the seat in the width direction while the first and second load sensors are arranged at the one of side surfaces of the seat where the buckle is provided.

6. The seat occupancy determination apparatus according to claim 3, wherein the buckle is fixed to one of side surfaces of the seat in the width direction while the first and second load sensors are arranged at the one of side surfaces of the seat where the buckle is provided.

* * * * *